US007023965B2

(12) United States Patent
Oates

(10) Patent No.: US 7,023,965 B2
(45) Date of Patent: Apr. 4, 2006

(54) APPARATUS AND METHOD FOR DISPLAYING A NAME OF A SPEAKER ON A TELECOMMUNICATION CONFERENCE CALL

(75) Inventor: John David Oates, Quakers Hill (AU)

(73) Assignee: Avaya Technology Corp., Basking Ridge, NJ (US)

(*) Notice: Subject to any disclaimer, the term of this patent is extended or adjusted under 35 U.S.C. 154(b) by 392 days.

(21) Appl. No.: 10/196,970

(22) Filed: Jul. 17, 2002

(65) Prior Publication Data

US 2004/0013244 A1 Jan. 22, 2004

(51) Int. Cl.
*H04M 1/64* (2006.01)
*H04M 3/42* (2006.01)

(52) U.S. Cl. .............................. 379/88.01; 379/88.02; 379/88.12; 379/88.17; 379/88.18; 379/158; 379/202.1; 379/265.09

(58) Field of Classification Search ............... 379/67.1, 379/88.01, 88.02, 88.12, 88.17, 88.18, 158, 379/202.1, 265.01, 265.09; 348/14.08, 14.09, 348/14.1
See application file for complete search history.

(56) References Cited

U.S. PATENT DOCUMENTS

| 5,369,694 | A | | 11/1994 | Bales |
| 5,373,549 | A | | 12/1994 | Bales |
| 5,473,367 | A | | 12/1995 | Bales |
| 5,475,747 | A | | 12/1995 | Bales |
| 5,539,741 | A | * | 7/1996 | Barraclough et al. ....... 370/267 |
| 5,590,127 | A | | 12/1996 | Bales |
| 5,729,532 | A | | 3/1998 | Bales |
| 6,457,043 | B1 | * | 9/2002 | Kwak et al. ................. 709/204 |
| 6,577,333 | B1 | * | 6/2003 | Tai et al. .................. 348/14.08 |
| 6,747,685 | B1 | * | 6/2004 | Taib et al. ................ 348/14.01 |
| 2003/0081751 | A1 | * | 5/2003 | Berstis |

* cited by examiner

*Primary Examiner*—Allan Hoosain
(74) *Attorney, Agent, or Firm*—John C. Moran

(57) ABSTRACT

During a telecommunication conference call, the name of the current speaker on the conference call is displayed on all telecommunication units that are utilized by the participants in the conference call.

12 Claims, 4 Drawing Sheets

APPARATUS AND METHOD FOR DISPLAYING A NAME OF A SPEAKER ON A TELECOMMUNICATION CONFERENCE CALL

TECHNICAL FIELD

This invention relates to telecommunication systems and methods in general, and in particular, to the control of telecommunication conference calls.

BACKGROUND OF THE INVENTION

Telecommunication conference calls are well known in the art. The capability of establishing a conference call among a number of parties on the public telephone network or on an enterprise switching system (also referred to as a business communication system or a PBX) is common. In addition, it is known to establish video conference calls where the parties are able to view the other participants in the conference call on a video display. The video conference calls most closely approximate an actual conference where people are gathered in one room to discuss a subject. During an actual conference or a video conference call, it is possible for all of the participants to immediately see who the current speaker of the conference is. The ability to identify the speaker of a conference is quite important for understanding the material that the speaker may be presenting. Also, without such identification of the speaker, the participants in the conference expend mental effort in identifying who the speaker is and are distracted from the actual material being presented.

SUMMARY OF THE INVENTION

This invention is directed to solving these and other problems and disadvantages of the prior art. According to an embodiment of the invention, during a telecommunication conference call, the name of the current speaker on the conference call is displayed on all telecommunication units that are utilized by the participants in the conference call.

DETAILED DESCRIPTION

Figure 1:
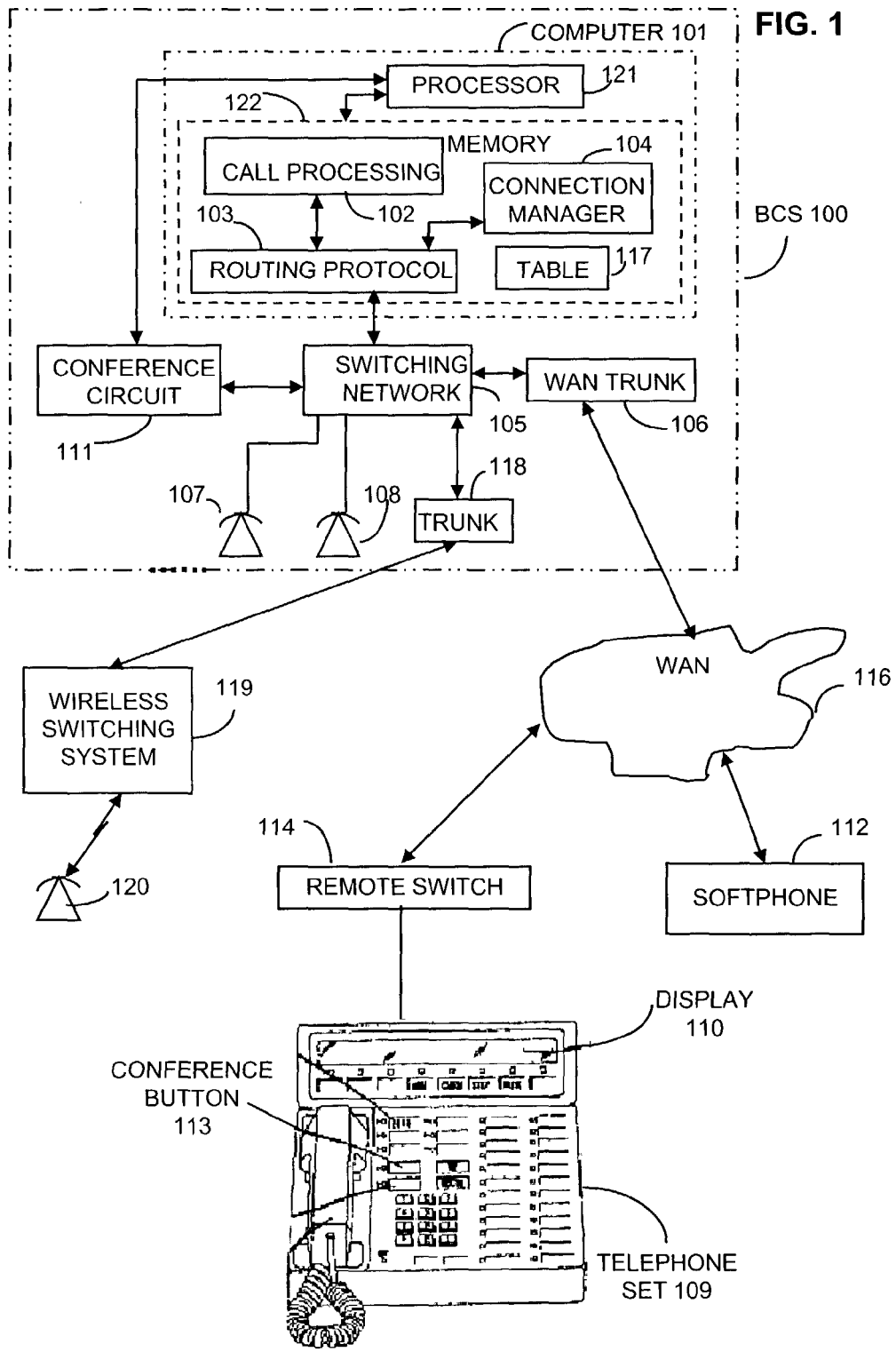
FIG. 1 illustrates an embodiment in accordance with the invention.

FIG. 1 illustrates a telecommunication system in accordance with an embodiment of the invention. The embodiment of FIG. 1 illustrates that conference circuit 111 utilized for implementing the conference is located in business communication system (BCS) 100 (also referred to as an enterprise switching system or PBX). However, one skilled in the art could readily see how to utilize conference circuit 111 in other embodiments of the invention where conference circuit 111 was located in an interexchange carrier, or local telephone office, or cellular switching system. As can be seen from FIG. 1, BCS 100 comprises computer 101 that performs the overall control functions for BCS 100, switching network 105, WAN trunk 106, conference circuit 111, and telephone sets 107–108. FIG. 1 illustrates that BSC 100 is communicating with remote switch 114 and soft phone 112 via wide area network (WAN) 116. Remote switch 114 and soft phone 112 are located geographically in different places than BSC 100. Remote switch 114 supports a variety of telephone sets and may also be connected into the public telephone network via trunk circuits that are not shown in FIG. 1. In addition, a mobile telephone set such as mobile telephone set 120 could be part of the conference call with speaker identification information being transmitted to mobile telephone set 120 by computer 101 via trunk 118 and wireless switching system 119. The operation of BCS 100 with remote switch 114 and soft phone 112 in such a geographically dispersed system is described in U.S. patent application Ser. No. 09/718,909 filed on Nov. 22, 2000, which is hereby incorporated by reference. Soft phone 112 could also be of the WAP/mobile IP type as is well known to those skilled in the art. (WAP refers to wireless application protocol.) As is disclosed in greater detail in the above-referenced patent application, call processing 102, routing protocol 103, and connection manager 104 applications provide the overall control of BCS 100, remote switch 114, and soft phone 112. Call processing application 102, routing protocol 103, and connection manager 104 comprise processor-executable instructions stored in the memory 122 of computer 101. Processor 121 executes these processor-executable instructions to implement the functions of these applications.

Telephones sets 107–108 are functionally the same as telephone set 109. These telephone sets are of a type that is commonly referred as digital telephone sets. These telephone sets receive both control and voice information via a digital transmission which may be implemented using an ISDN protocol or a some other protocol well known by those skilled in the art. One skilled in the art would immediately realize that the ISDN protocol is implemented within the public telephone switching network. Hence, telephones such as telephone set 109 can be connected to the public telephone network and be utilized in another embodiment of the invention. Soft phone 112 is well known in the art and normally is a personal computer that implements telephone functions. The manner in which soft phone 112 is interconnected and controlled by BCS 100 is set forth in detail in the above-incorporated patent application.

To better understand the operation of an embodiment of the invention illustrated in FIG. 1, consider the following example. The user of telephone set 109 initiates a conference call by calling telephone sets 107 and 108 utilizing standard operations. When the user has established a call to each of these phones, the user activates conference button 113. The actuation of button 113 is transmitted by telephone set 109 via remote switch 114, WAN 116, WAN trunk 106, switching network 105 and routing protocol application 103 to call processing application 102. Call processing application 102 then sends control messages to switching network 105 to transfer the audio information being received from telephone sets 107–109 to conference circuit 111, to accept the resulting audio information from conference circuit 111 and to reroute this resulting audio information back to the telephone sets.

Call processing application 102 also transmits control messages to conference circuit 111 to activate it to perform the conferencing operations. Conference circuit 111 conferences the audio information being received from telephone sets 107–109 via switching network 105 and communicates this conferenced audio-information to switching network 105 for distribution to the telephone sets. In addition, conference circuit 111 determines on a continuous real-time basis which telephone set the present speaker is utilizing. This telephone set identification information is transmitted to call processing application 102.

In response to the telephone set identification, call processing application 102 then accesses internal table 117 to determine who the user of the identified telephone set is. Table 1 17 accessed by call processing application 102 is routinely maintained on systems such as BCS 100 for the purpose of performing caller identification operations, etc. Call processing application 102 then transmits the speaker identification information to the telephone sets via the communication paths illustrated on FIG. 1. For example, the communication path to telephone set 109 is via routing protocol application 103, switching network 105, WAN trunk 106, WAN 116, and remote switch 114.

The identification of the speaker and subsequent communication of the speaker identification to the telephone sets that are part of the conference call is performed on an ongoing basis. One skilled in the art could readily realize that this could be performed at periodic intervals of predefined lengths. The speaker identification received by a particular telephone set is displayed on the integral display of the telephone set. For example, telephone set 109 displays the speaker identification on display 110. The transmission of information such as caller identification is well known in the art and is routinely done on systems such as BCS 100. The speaker identification would utilize similar messaging as the caller identification information.

Figure 2:
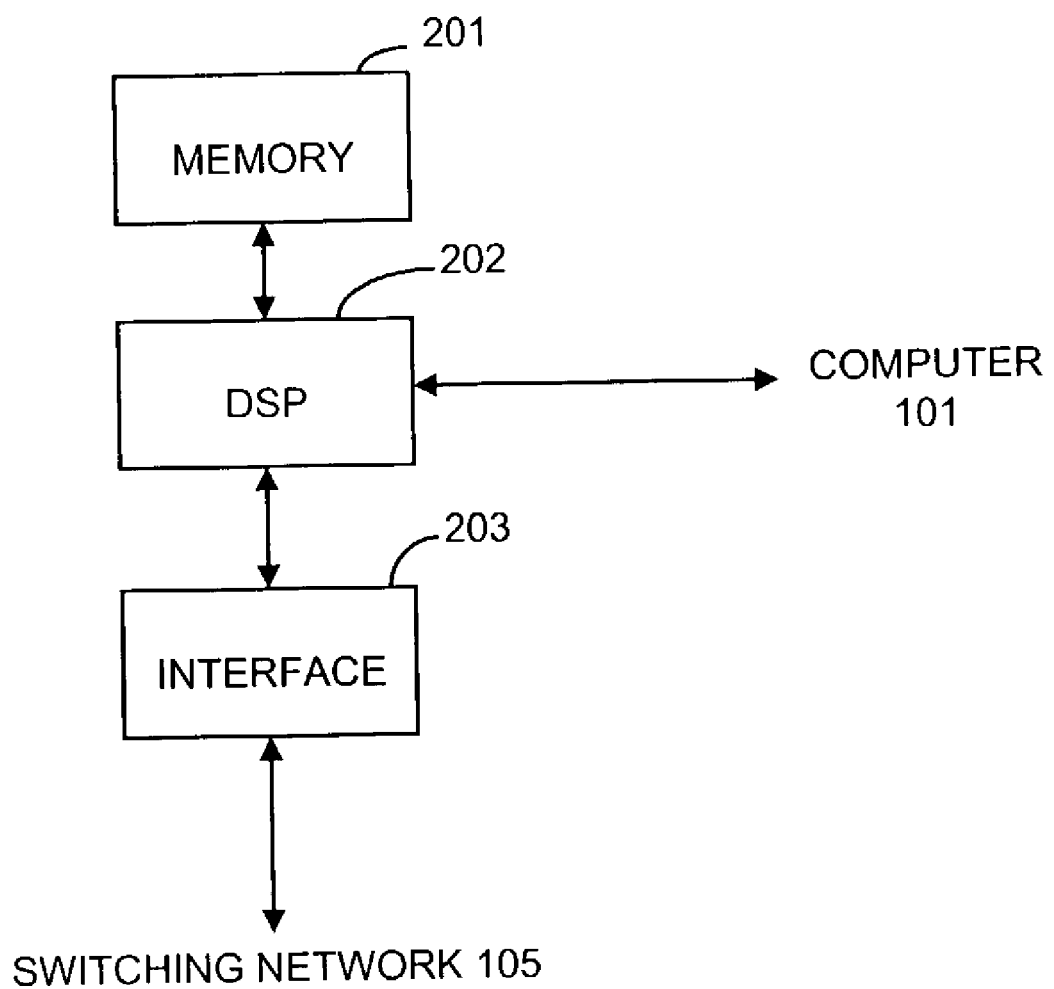
FIG. 2 illustrates, in block diagram form, a digital signal processor for utilization in an embodiment of the invention.

FIG. 2 illustrates an embodiment of conference circuit 111. Digital signal processor (DSP) 202 performs the functions of conference circuit 111 as illustrated by the operations of the flowchart illustrated in FIG. 3 by executing instructions and storing data in memory 201. DSP 202 interconnects to switching network 105 via interface 203. DSP 202 also has a control message link to computer 101. DSP 202 performs the standard conferencing operation of combining audio information received from the telephone sets that are part of the conference call and transferring this information back to switching network 105 using techniques well known to those skilled in the art. In an embodiment of the invention, DSP 202 converts the audio information being received from the telephone sets from the encoding protocol utilized by the sets to 16-bit digitized words to perform the conferencing functions. This 16-bit digitized voice information is not compressed in any manner. DSP 202 also computes the root mean squared value from the 16-bit digitized voice information for each voice information stream being received from the telephone sets. DSP 202 utilizes the highest value computed from any telephone set to designate that telephone set as being used by the present speaker on the conference call. DSP 202 transmits this telephone set identification to computer 101.

Other embodiments of determining the present speaker would utilize voice recognition techniques or other mathematical algorithms for determining the telephone set being utilized by the speaker. One skilled in the art would readily realize that DSP 202 and its associated memory 201 could be replaced by using various implementations of hardware logic. In addition, rather than there only being one DSP, multiple DSPs could be utilized. Further, one skilled in the art would realize that a digital signal processor would not have to be utilized to implement processor 202 but a general purpose computer could be utilized for this purpose.

Figure 3:
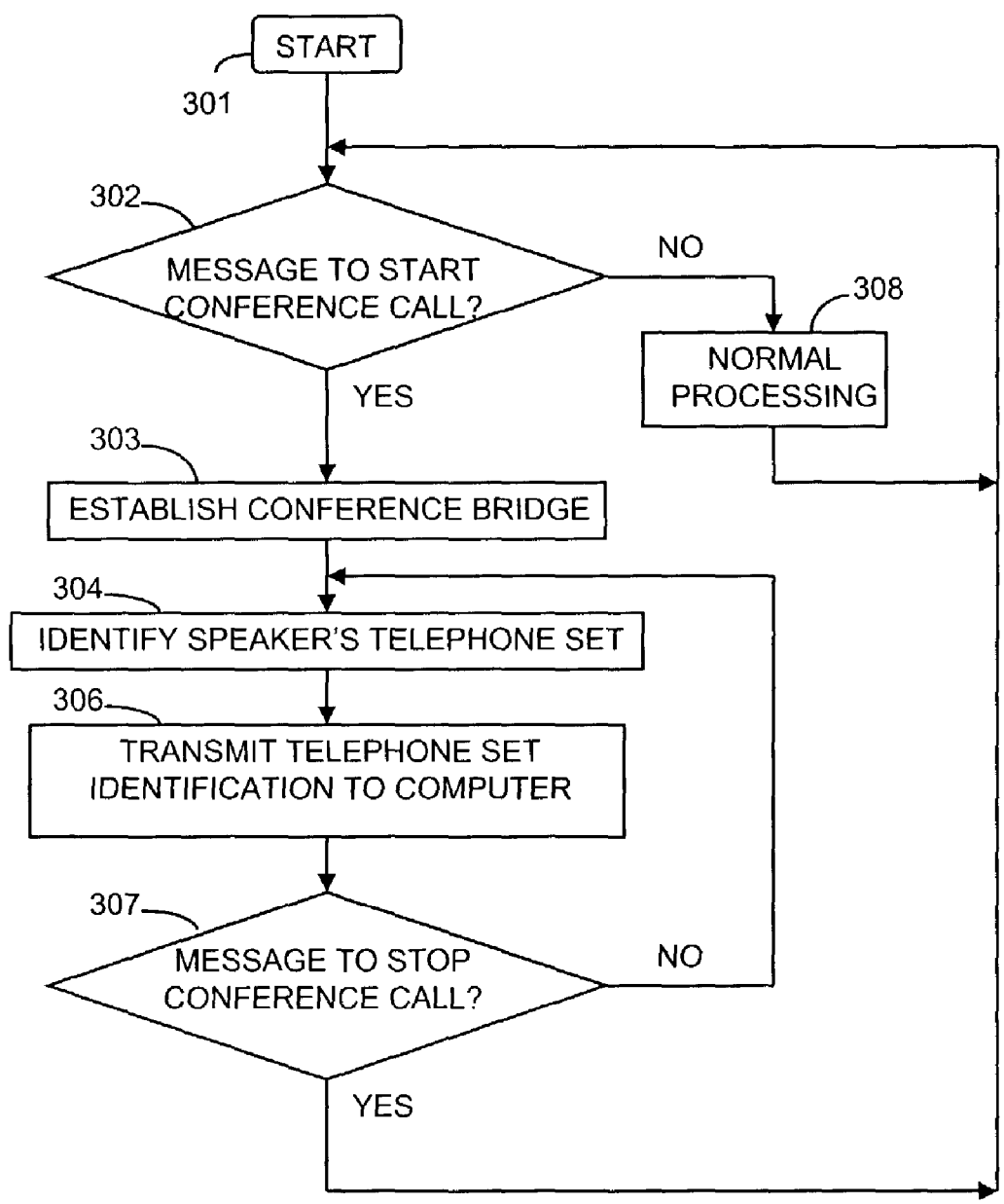
FIG. 3 illustrates, in flowchart form, an embodiment of the invention.
Figure 4:
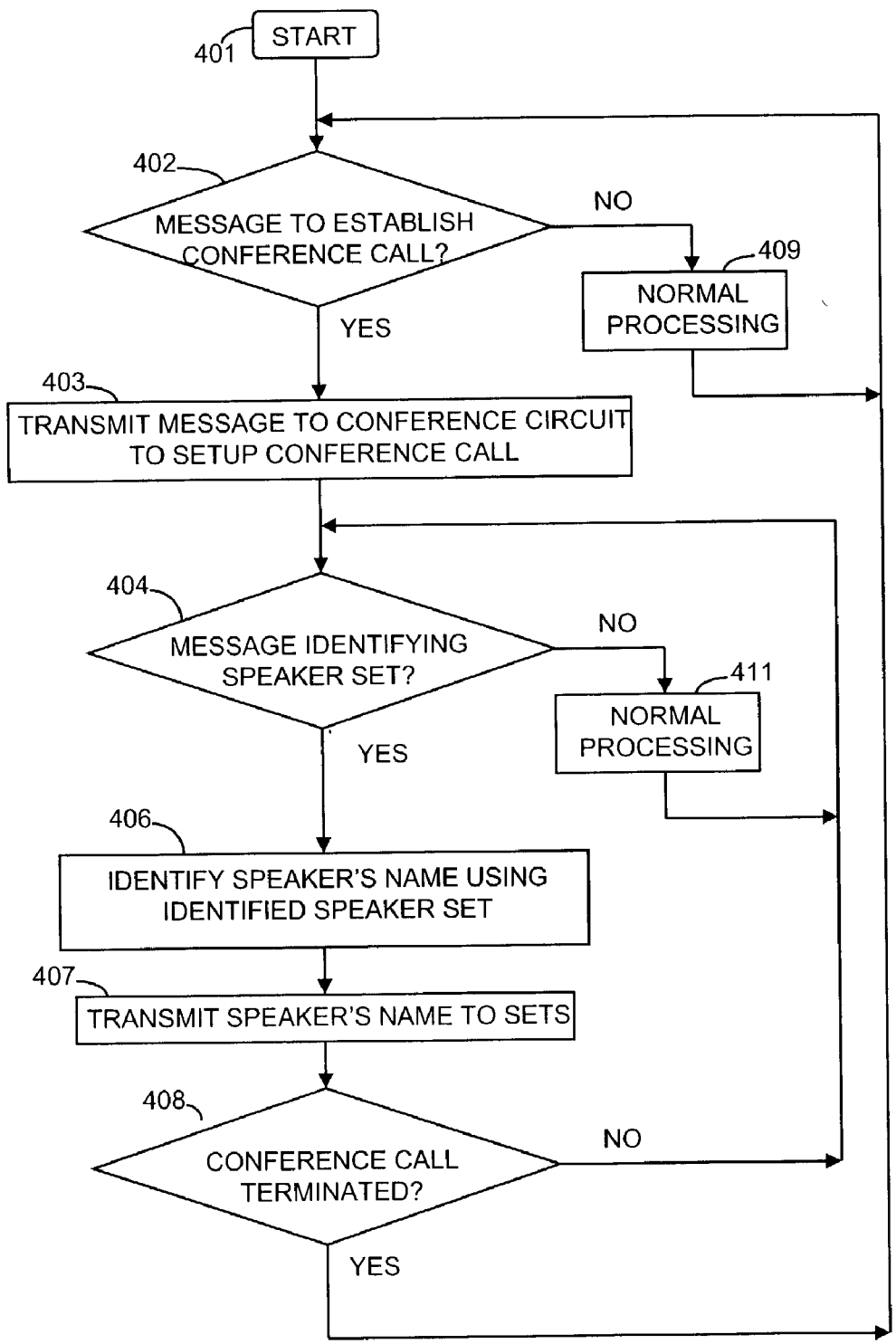
FIG. 4 illustrates, in flowchart form, an embodiment of the invention.

FIGS. 3 and 4 illustrate in flowchart form, operations performed by BCS 100. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 3 and 4 or may include additional functions without departing significantly from the functionality of an embodiment of the invention. For example, two blocks shown in succession in FIGS. 3 and 4 may in fact be executed substantially concurrently, the blocks may sometimes be executed in the reverse order, or some of the blocks may not be executed in all instances, depending upon the functionality involved, as will be further clarified below. All such modifications and variations are intended to be included herein within the scope of this disclosure and to be protected by the accompanying claims.

FIG. 3 illustrates, in flowchart form, operations performed by conference circuit 111 in an embodiment of the invention. After being started in block 301, decision block 302 determines if there is a message to start a conference call being received from computer 101. If the answer is no, block 308 performs normal processing before transferring control back to decision block 302. If the answer in decision block 302 is yes, block 303 establishes the operations that will conference the audio information being received from switching network 105 and return this conferenced information back to switching network 105. In addition, block 303 establishes the operations that will compute the identity of the telephone set used by the speaker on the conference call. Block 304 identifies the speaker's telephone set based on information that is being calculated from operations established by block 303. Block 306 transmits the telephone set identification to computer 101. Finally, decision block 307 determines if a message has been received from computer 101 to stop the conference operations. If the answer is no, control is transferred back to block 304. If the answer is yes, control is transferred back to decision block 302.

FIG. 4 illustrates the operations performed by computer 101 in implementing an embodiment of the invention. After being started in block 401, decision block 402 determines if a message has been received from a telephone set to establish a conference call. If the answer is no, block 409 does normal call processing before transferring control back to decision block 402. If the answer in decision block 402 is yes, block 403 determines the participants in the conference call and transmits this information in a message to conference circuit 111 requesting that conference circuit 111 establish or set up the conference operations. Decision block 404 next determines if a message is being received from conference circuit 111 identifying the telephone set being utilized by the present speaker. If the answer is no, control is transferred to block 411 which performs normal call processing before transferring control back to decision block 404.

If the answer in decision block 404 is yes, block 406 accesses table 117 to obtain the speaker's name by utilizing the telephone set identification as an index into table 117. After execution of block 406, block 407 transmits the speaker's name to all of the telephone sets so that all of the telephone sets will display this name on their integral display panels such as display 110. Control is then transferred to decision block 408 by block 407. Decision block 408 determines if the conference call has been terminated utilizing well known techniques. If the answer is no, control is transferred back to decision block 404. If the answer is yes, control is transferred to decision block 402. One skilled in the art would immediately realize that decision block 408 could also be determining whether or not to add or drop participants to the conference call and to perform those operations.

When the operations of computer 101 and conferencing circuit are implemented in software, as is shown in FIGS. 3 and 4, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. BCS 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

In an alternative embodiment, where computer 101 and conferencing circuit 111 are implemented in hardware, computer 101 and conferencing circuit 111 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above would be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for identification of speakers on a telecommunication conference call, comprising the steps of:
   establishing the telecommunication conference call among a plurality of telecommunication sets;
   receiving audio information from each of the plurality of telecommunication sets;
   uncompressing the received audio information from each of the plurality of telecommunication sets;
   computing a root mean squared value for the uncompressed audio information for each of the plurality of telecommunication sets; and
   selecting a one of the plurality of telecommunication sets having the largest root mean squared value as an active one of the plurality of telecommunication sets being used by a present speaker on telecommunication call;
   accessing a table with the identification of the determined active one of the plurality of telecommunication sets to obtain an identity of a speaker assigned to the active one of the plurality of telecommunication sets;
   transmitting the identity of the speaker to each of the plurality of telecommunication sets; and
   displaying the identity of the speaker on a display of each of the plurality of telecommunication sets by each of the plurality of telecommunication sets.

2. The method of claim 1 wherein the steps of uncompressing, computing and selecting are performed for a predefined amount of time.

3. The method of claim 1 wherein the table of the step of accessing is used for providing other telecommunication call operations.

4. The method of claim 1 wherein the step of displaying comprises the step of using a display unit that is an integral part of each of the plurality of telecommunication sets.

5. An apparatus for providing information about a telecommunication conference call, comprising:
   a conferencing circuit;
   a plurality of telecommunication sets;
   a computer for transmitting signals to a switching network and the conferencing circuit to establish a telecommunication conference call;
   the switching network responsive to the signals from the computer for connecting the plurality of telecommunication sets to the conferencing circuit;
   conferencing circuit responsive to the signals from the computer and audio information from each of the telecommunication sets converting the audio information to uncompressed audio information, determining a root mean squared value for the uncompressed audio information from each of the telecommunication sets, designating the active one of the plurality of telecommunication sets based on one at the plurality of telecommunication sets having the largest root mean squared value to identify an active one of the plurality of telecommunication sets used by a speaker on the telecommunication conference call and transmitting the identification to the computer;
   the computer responsive to the identification for determining a speaker identification and for transmitting the speaker identification to each of the plurality of telecommunication sets.

6. The apparatus of claim 5 wherein each of the plurality of telecommunication sets responsive to the speaker identification for displaying the speaker identification.

7. The apparatus of claim 6 wherein each of the plurality of telecommunication sets displays the speaker identification on an integral display.

8. The apparatus of claim 5 wherein the conferencing circuit performs the identification of the one of telecommunication sets in a predefined amount of time.

9. A processor-readable medium comprising processor-executable instructions configured for:
   establishing a telecommunication conference call among a plurality of telecommunication sets;

receiving audio information from each of the plurality of telecommunication sets;

uncompressing the received audio information from each of the plurality of telecommunication sets;

computing a root mean squared value for the uncompressed audio information for each of the plurality of telecommunication sets; and selecting a one of the plurality of telecommunication sets having the largest root mean squared value as an active one of the plurality of telecommunication sets being used by a present speaker on telecommunication call;

accessing a table with the identification of the determined active one of the plurality of telecommunication sets to obtain an identity of a speaker assigned to the active one of the plurality of telecommunication sets;

transmitting the identity of the speaker to each of the plurality of telecommunication sets; and displaying the identity of the speaker on a display of each of the plurality of telecommunication sets by each of the plurality of telecommunication sets.

10. The processor-readable medium of claim 9 wherein the uncompressing, computing and selecting are performed for a predefined amount of time.

11. The processor-readable medium of claim 9 wherein the table is used for providing other telecommunication call operations.

12. The processor-readable medium of claim 9 wherein the displaying comprises using a display unit that is an integral part of each of the plurality of telecommunication sets.

* * * * *